United States Patent [19]

Holdeman

[11] 4,103,753

[45] Aug. 1, 1978

[54] MANUALLY SHIFTABLE PLANETARY GEARSET

[75] Inventor: John William Holdeman, Muncie, Ind.

[73] Assignee: Borg-Warner Corporation, Chicago, Ill.

[21] Appl. No.: 762,371

[22] Filed: Jan. 25, 1977

Related U.S. Application Data

[63] Continuation of Ser. No. 621,194, Oct. 9, 1975, abandoned.

[51] Int. Cl.² .......................... F16H 3/44; B60K 17/34
[52] U.S. Cl. ................................... 180/49; 74/750 R; 74/785; 180/70 R
[58] Field of Search ................. 180/44 R, 49; 74/785, 74/750 R

[56] References Cited

U.S. PATENT DOCUMENTS

| 1,413,943 | 4/1922 | Snyder | 74/785 |
|---|---|---|---|
| 1,792,484 | 2/1931 | Fawick | 74/785 |
| 2,180,527 | 11/1939 | Jones | 74/785 X |
| 2,331,684 | 10/1943 | Henningsen | 74/785 |
| 2,399,201 | 4/1946 | Buckendale | 180/49 |
| 2,592,910 | 4/1952 | Keller | 74/750 R X |
| 2,601,151 | 6/1952 | Keller | 74/750 R X |
| 2,734,400 | 2/1956 | Andershock | 74/785 |
| 2,787,919 | 4/1957 | Senkowski | 74/750 R |
| 2,947,200 | 8/1960 | Stump | 74/710.5 |
| 3,107,763 | 10/1963 | Hill | 74/710.5 X |
| 3,477,314 | 11/1969 | Rutkowski | 74/750 R |
| 3,872,742 | 3/1975 | States | 74/785 |
| 3,895,546 | 7/1975 | Yamaguchi | 74/710.5 X |

FOREIGN PATENT DOCUMENTS 899,607  6/1945  France ................... 180/44 R

*Primary Examiner*—John P. Silverstrim
*Attorney, Agent, or Firm*—Julian Schachner

[57] ABSTRACT

A power transfer mechanism incorporating a planetary or epicyclic gearset which may be shifted manually between high and low range conditions for direct drive and reduction ratio drive modes. The ring and planet gears are unloaded in the direct drive mode, thus avoiding vibration and wear commonly experienced when running locked-up. The mechanism may be incorporated in a multiple path drive system comprising a transfer case disposed between a source of input torque and a pair of drive axles, wherein torque is transferred directly to one drive axle and automatically to the other drive axle, when required, through a double-acting overrunning clutch.

17 Claims, 6 Drawing Figures

MANUALLY SHIFTABLE PLANETARY GEARSET

This is a continuation of application Ser. No. 621,194 filed Oct. 9, 1975, now abandoned.

BACKGROUND OF THE INVENTION

This invention relates generally to a power transfer mechanism incorporating a planetary gearset.

In recent years, there have been many improvements in drive trains, including improvements relating to planetary gearing for establishing paths for the transfer of power in high and low range modes. Some such planetary gearsets are shifted by engaging and disengaging friction elements manually, hydraulically, electrically, or by some other suitable means. Other planetary gearsets are shifted by engaging and disengaging clutches. Normally, this is done by sliding sleeves into and out of dental engagement with various elements for establishing high and low range modes. This requires considerable space and a large number of parts within the assembly. The planetary gearsets may be provided with ring gears which are moved into and out of engagement with planet or sum gears for establishing the various modes. However, in these arrangements, the system is generally loaded when running in the locked-up condition, thus causing vibration and excessive wear.

SUMMARY OF THE INVENTION

This invention is directed in brief to an improved planetary gearset. The planetary gearset includes a planet carrier and ring gear which slide as a unit to provide direct drive through engagement of the sun gear with the planet carrier, and to provide reduction ratio drive through engagement of the ring gear with the case. Power input is to the sun gear. Power output is from the carrier. Output may be from one end of the carrier or, if the torque is to be split, from both ends of the carrier.

In direct drive, the carrier meshes with the sun gear, transmitting power without loading the planet and ring gears, thus avoiding vibratory wear commonly experienced when running in the locked-up condition. In reduction drive, the carrier and ring gear assembly is moved to disengage the carrier from the sun gear and to engage the ring gear with a stationary member. In neutral, the carrier is disengaged from the sun gear but remains engaged with output elements, and the ring gear is disengaged from the stationary member. An additional shift position may be provided, if desired, to disengage the carrier from the output elements and establish a towing mode.

The improved planetary gearset may be incorporated in a four-wheel drive transfer case for use between a prime mover and a pair of drive axles. The mechanism includes a transfer case adaptable for transferring torque from the input to one output directly and to another output through an overrunning clutch.

BRIEF DESCRIPTION OF THE DRAWINGS

The objects and advantages of this invention will become apparent to those skilled in the art upon careful consideration of the specification herein, including the drawings, wherein.

Figure 1:
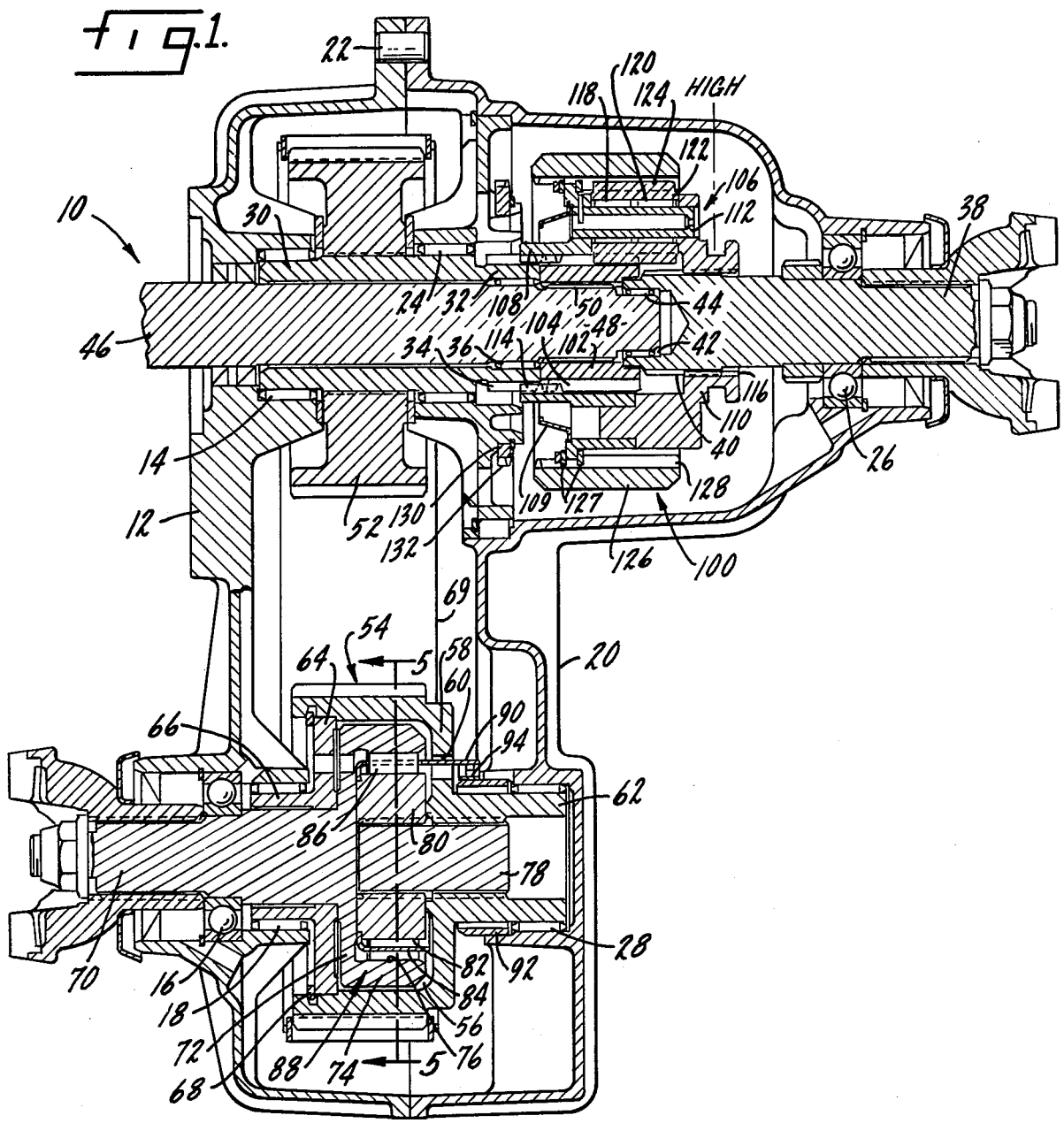
FIG. 1 is a sectional view showing details of the torque transfer case including the improved planetary gearset in the high range position for establishing direct drive to a rear output coaxial with the input and to a front output offset therefrom.

While this invention is susceptible of embodiment in many different forms, there is shown in the drawings and will be described herein in detail a preferred embodiment with the understanding that the present disclosure is to be considered as an exemplification of the principles of the invention and is not intended to limit the invention to this embodiment.

DESCRIPTION OF THE PREFERRED EMBODIMENT

Referring now to the drawings in greater detail, there is shown generally a torque transfer case 10 particularly adapted for use in an automotive vehicle incorporating a four-wheel drive system. Torque transfer case 10 is suitable for transmitting torque from a prime mover through a plurality of drive axle assemblies to drive front and rear pairs of traction wheels.

Torque transfer case 10 includes a first housing section 12 which supports bearings 14, 16 and 18. Torque transfer case 10 also includes a second housing section 20 suitably secured to housing section 12 and aligned by a plurality of dowels 22 or the like. Housing section 20 supports bearings 24, 26 and 28.

A sleeve 30 is journalled in bearings 14 and 24. Sleeve 30 includes an annular extension 32 which defines outwardly facing teeth 34. A bearing 36 is located inwardly of annular extension 32.

A rear output or propeller shaft 38 is journalled in bearing 26 and extends into transfer case 10. Output shaft 38 defines outwardly facing teeth 40, and is provided with an axial bore 42 in which a bearing 44 is located.

An input shaft 46 extends into transfer case 10 and is journalled in bearing 36. Input shaft 46 defines an end portion 48 received in axial bore 42 of output shaft 38 and journalled in bearing 44. A spline 50 is defined by input shaft 46 between bearings 36 and 44. Input shaft 46 is adapted to receive torque, for example, from an associated transmission of an automotive vehicle. It should be understood that input shaft 46 may be the output shaft of such a transmission.

A first sprocket 52 is secured to sleeve 30 for rotation therewith. A second sprocket 54 defines an interior pocket 56. Sprocket 54 includes a flange 58 which defines a plurality of openings 60 extending therethrough and spaced around its periphery to communicate pocket 56 with the exterior thereof. Sprocket 54 also includes an annular extension 62. Also forming a portion of sprocket 54 is a flange 64 including an annular extension 66. Flange 64 is secured to sprocket 54 by means of a locking ring 68 or the like. Sprocket assembly 54 is journalled in bearings 18 and 28. A suitable chain 69 couples sprockets 52 and 54. Sprocket 52, chain 69 and sprocket 54 form a chain drive train.

A front output of propeller shaft 70 is journalled in bearing 16 and extends into transfer case 10. Output shaft 70 defines an upstanding flange 72 having an annular extension 74 within pocket 56 of sprocket assembly 54. Extension 74 defines an outer clutch race 76 of cylindrical configuration.

A stub shaft 78 is secured to extension 62 of sprocket assembly 54 for rotation therewith. An annular element or cam 80 is splined to stub shaft 78. Cam 80 is within pocket 56 defined by sprocket assembly 54 and defines an inner clutch race 82 comprising a plurality of facets or ramp surfaces.

An annular roller cage 84 supports a plurality of rollers 86, one of which is associated with each facet of inner race 82. Extension 74, cam 80, cage 84, and rollers 86 form a double-acting overrunning clutch 88.

Cage 84 defines a plurality of fingers 90 extending through openings 60 in flange 58. An annular wear ring 92 is pressed into housing section 20 in opposed relationship to fingers 90. A plurality of drag shoes 94 are provided, each engaged by a finger 90 for rotation therewith. Drag shoes 94 are in frictional contact with wear ring 92, and may be spring biased toward this frictional contact. As a result, balanced radial drag forces are developed which cause a relative drag effect on roller cage 84. This effect is taught in application Ser. No. 572,690 filed Apr. 28, 1975.

Figure 2:
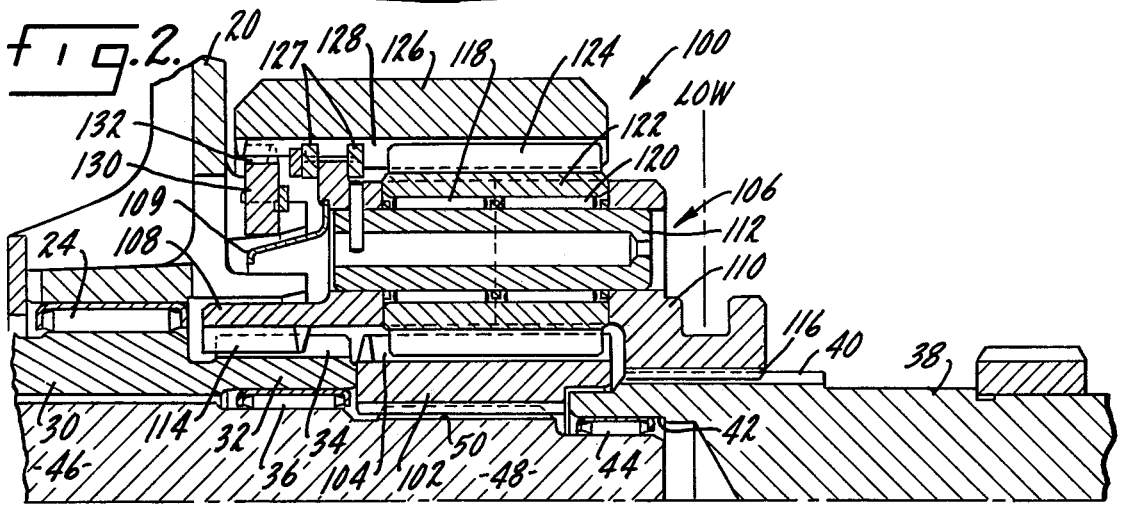
FIG. 2 is a partial sectional view on an enlarged scale showing details of the planetary gearset in the low range position providing reduction ratio drive.
Figure 3:
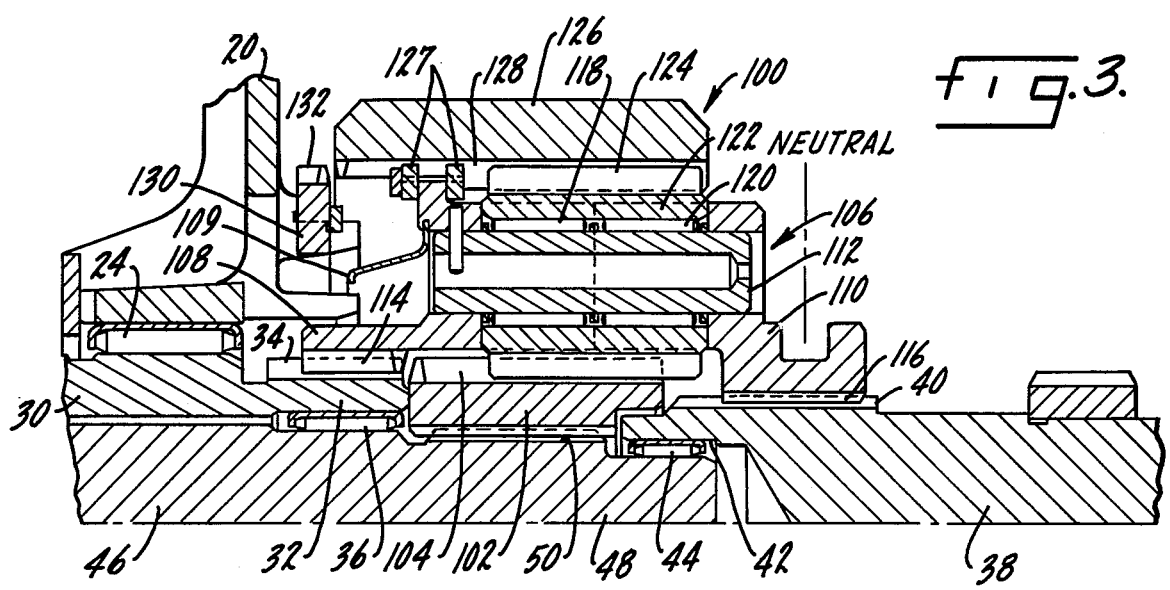
FIG. 3 is a partial sectional view on an enlarged scale showing details of the planetary gearset in the neutral position.
Figure 4:
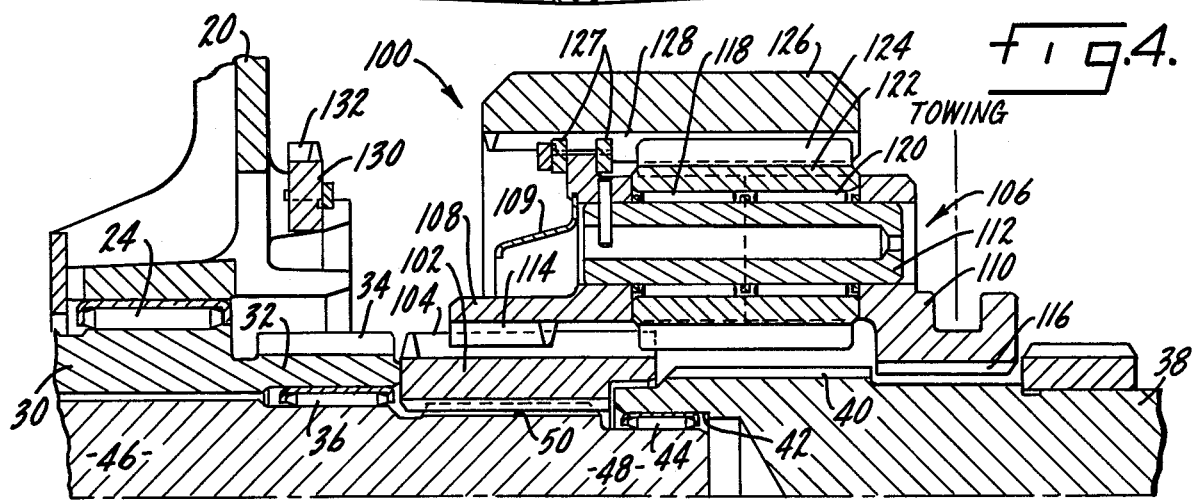
FIG. 4 is a partial sectional view on an enlarged scale showing details of the planetary gearset in the towing position.

Turning now to a detailed description of the manually shiftable planetary gearset, attention is directed in particular to FIGS. 1, 2, 3 and 4. FIG. 1 shows the planetary gearset 100 in its high range position for establishing direct drive. FIG. 2 shows the low range position for establishing reduction ratio drive, FIG. 3 shows the neutral position, and FIG. 4 shows the optional towing position.

Planetary gearset 100 includes a sun gear 102 defining teeth 104 on the exterior thereof. Sun gear 102 is secured to input shaft 46 by means of spline 50 for rotation therewith. As so secured, teeth 104 are in alignment with teeth 34 on extension 32 of sleeve 30. A planet carrier 106 includes a pair of end sections 108 and 110 secured for movement together. Sections 108 and 110 support a plurality of shafts 112, one of which is shown in the drawings, spaced in an annular configuration. End section 108 supports an oil collector 109 and defines inwardly facing teeth 114 in alignment with teeth 34 and 104 for engagement therewith. Similarly, end section 110 defines inwardly facing teeth 116 in alignment with teeth 40 on output shaft 38 for engagement therewith.

Each shaft 112 carries a pair of spaced bearings 118 and 120 between end sections 108 and 110. Journalled on each pair of bearings 118 and 120 is a planet gear 122. Planet gears 122 define outwardly facing teeth 124 in mesh with teeth 104 of sun gear 102.

A ring gear 126 is supported outwardly of end section 108 of planet carrier 106. A pair of spaced locking rings 127 is provided to carry ring gear 126 with planet carrier 106, without hindering rotation of ring gear 126. Ring gear 126 defines inwardly facing teeth 128 in mesh with teeth 124 of planet gears 122.

An annular element 130 is secured to housing section 20. Element 130 defines outwardly facing teeth 132 in alignment with teeth 128 of ring gear 126. It should be understood that element 130 may be formed as an integral part of housing section 20 if desired.

With particular reference to FIG. 1, planetary gearset 100 is in its high range position establishing the direct drive mode. Teeth 114 are in mesh with teeth 104 and teeth 34, thereby engaging planet carrier 106 with both sun gear 102 and sleeve 30. Teeth 116 are in mesh with teeth 40, thereby engaging planet carrier 106 with output shaft 38. Planet gears 122 are in mesh with both sun gear 102 and ring gear 126.

Torque is received by input shaft 46 and is transferred through sun gear 102 and planet carrier 106 directly to sleeve 30 and output shaft 38. In this direct drive mode, the planet and ring gears are unloaded, thereby avoiding vibration and wear commonly experienced when running in the locked-up condition, especially in heavy-duty vehicles.

With particular reference to FIG. 2, planetary gearset 100 is in its low range position establishing the reduction ratio drive mode. It is apparent that planet carrier 106 is slidable and carries therewith ring gear 126 and planet gears 122, all as a unit. Suitable means, not shown, engages end section 110 to slide planet carrier 106 leftwardly to a position where teeth 114 remain in mesh with teeth 34 but not with teeth 104, and teeth 116 remain in mesh with teeth 40. Teeth 128 are in mesh with teeth 132, thereby effectively, grounding ring gear 126 by locking it to housing section 20. Planet gears 122 remain in mesh with both sun gear 102 and ring gear 126. In this position, ring gear 126 acts as a reaction member, and planet gears 122 planetate. As planet carrier 106 is engaged with both sleeve 30 and output shaft 38, torque received by input shaft 46 is transferred through planetary gearset 100 to provide reduction ratio torque to sleeve 30 and output shaft 38.

FIG. 3 shows planetary gearset 100 in its neutral position. Planet carrier 106 has been slid to a position between the high and low range positions, where teeth 114 are not in mesh with teeth 104, thereby disengaging planet carrier 106 from sun gear 102. Teeth 128 are not in mesh with teeth 132, thereby disengaging ring gear 126 from housing section 20. In this mode, it is apparent that planetary gearset 100 will freewheel without transmitting torque to either sleeve 30 or output shaft 38.

The optional towing position is shown in FIG. 4. Planet carrier 106 has been slid rightwardly beyond the high range position to move teeth 114 and 116, respectively, out of mesh with teeth 34 and 40. This disengages planet carrier 106 from both sleeve 30 and output shaft 38, which are thus free to rotate without causing damage to an automatic transmission, for example.

In one preferred form of the invention, output shaft 38 may be connected to a rear drive axle assembly of an associated vehicle. Output shaft 70 may be connected to the front drive axle assembly of an associated vehicle.

Output shaft 70 normally rotates faster than output shaft 38. This is inherent when the vehicle is turning, since the front wheels travel through a larger radius than do the rear wheels. For straight movement, this may be accomplished by providing front and rear axles having slightly different gear ratios, front wheels slightly smaller than rear wheels, or by inflating the front tires to a pressure slightly less than that in the rear tires. Other suitable means may be provided for causing output shaft 70 normally to overrun output shaft 38.

Sleeve 30 and output shaft 38 rotate together. Torque is transmitted from sleeve 30 through the chain drive train to drive stub shaft 78 and cam 80. Annular extension 74 rotates with output shaft 70. Thus, under normal conditions, annular element 74 and outer clutch race 76 rotate faster than cam 80 and inner clutch race 82. Roller cage 84 is rotated, and fingers 90 carry drag shoes 94. Due to the frictional engagement of drag shoes 94 with housing section 20, balanced radial forces are developed which result in a relative drag effect on roller cage 84. This relative drag effect is developed without any axial forces acting on roller cage 84, and thus there is no tendency for roller cage 84 to bind.

Figure 5:
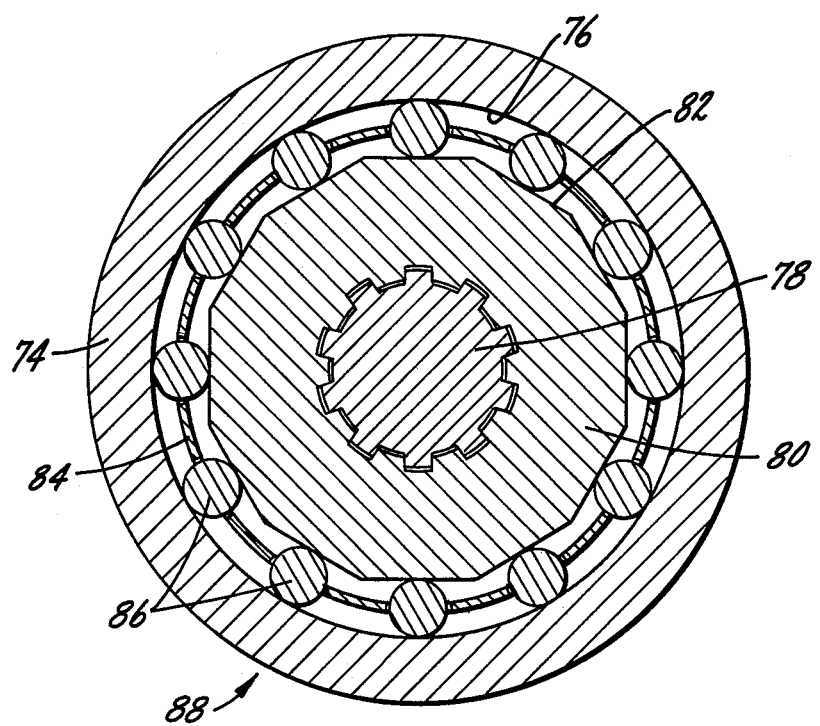
FIG. 5 is a sectional view on an enlarged scale, taken along the line 5—5 of FIG. 1, showing details of the overrunning clutch.

With reference to FIG. 5, assume cam 80 is rotating in the clockwise direction. Extension 74 also is rotating in the clockwise direction, but at a slightly faster speed. The drag effect on roller cage 84 causes rollers 86, in effect, to rotate relatively in the counterclockwise direction. Rollers 86 tend to wedge between inner race 82 and outer race 76 so as to engage clutch 88. However, due to the fact that extension 74 is overrunning cam 80, a force is developed which acts on rollers 86 such that they will be carried in the clockwise direction, relatively, away from their engaged position. Thus, the relative rotation between extension 74 and cam 80 prevents engagement of clutch 88. As a result, torque is transferred to output shaft 38 but not to output shaft 70. In this condition, the operation is essentially that of a conventional two-wheel drive vehicle.

If the rear wheels lose traction, output shaft 38 will speed up. This will be reflected in stub shaft 78, which rotates with output shaft 38. When stub shaft 78, and cam 80, are rotating at the same speed as extension 74, the drag effect on roller cage 84 will cause rollers 86 to wedge between inner race 82 and outer race 76. When this takes place, torque will be transferred both to output shaft 38 and through clutch 88 to output shaft 70. In this condition, the operation is essentially that of a conventional four-wheel drive vehicle in locked-up mode.

When the rear wheels regain traction, output shaft 70 will again overrun output shaft 38 and stub shaft 78. Rollers 86 will be carried away from their engaged position toward a freewheeling position, thereby disengaging clutch 88 and restoring the vehicle to the two-wheel drive condition. Thus, it will be seen that the transfer case provides for establishment of four-wheel drive automatically as required, and for establishment of two-wheel drive automatically when four-wheel drive is not required. This automatic engaging and disengaging feature is provided when the vehicle is moving in either the forward or reverse direction; that is, when output shafts 38 and 70 are rotating in either the clockwise or counterclockwise direction.

This automatic engaging and disengaging feature is provided when planetary gearset 100 is in either the direct drive mode or the reduction ratio drive mode. In either case, torque input is to sun gear 102, and torque output is from planet carrier 106. In the single offset configuration shown in FIG. 1, the torque is split, some transferred directly to rear output shaft 38, and some through sleeve 30, the chain drive train and clutch 88 to front output shaft 70. Of course, neither output shaft receives torque when planetary gearset 100 is in either the neutral or towing position.

Figure 6:
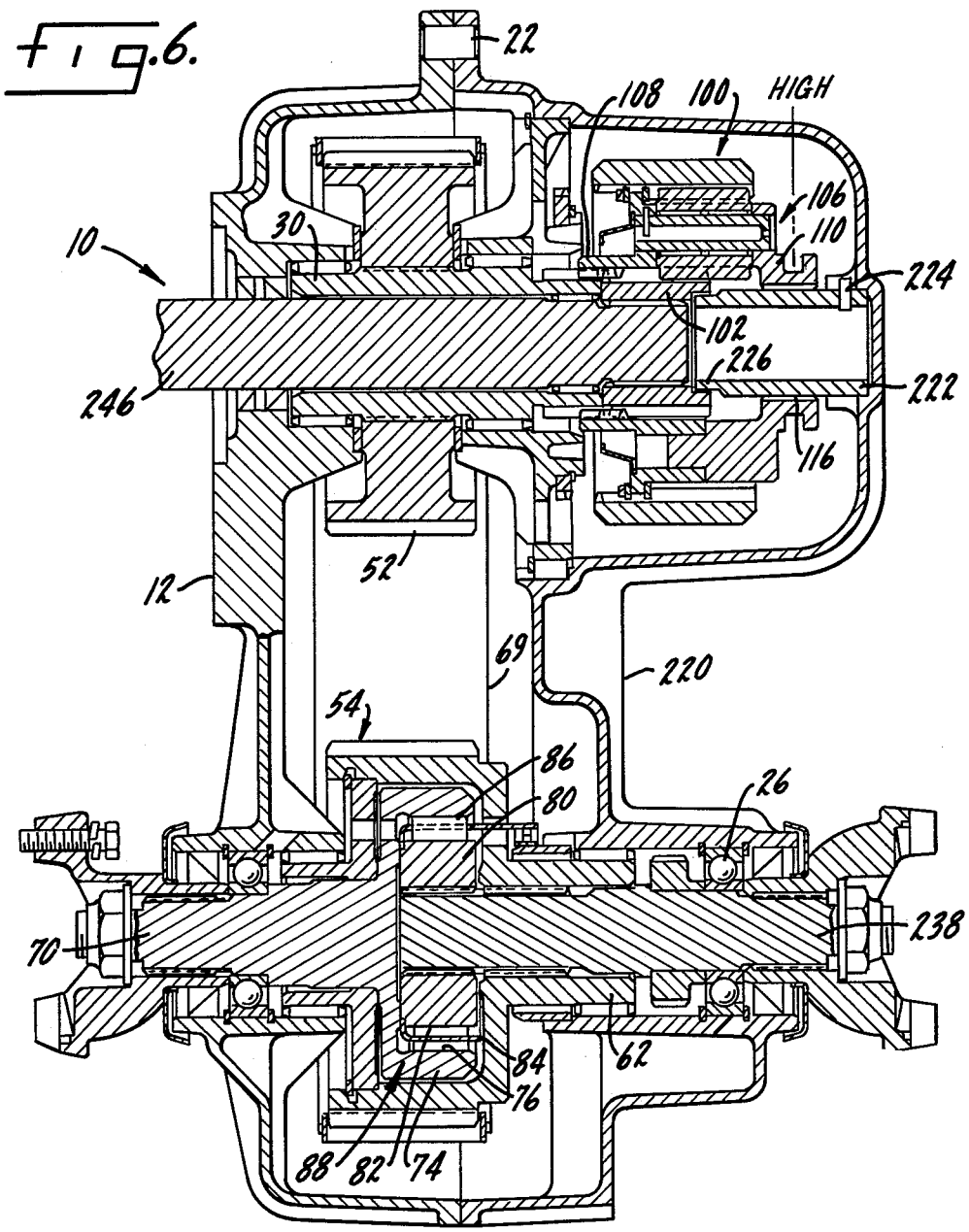
FIG. 6 is a sectional view, similar to FIG. 1, showing details of the torque transfer case in a configuration wherein both outputs are offset from the input.

Turning now to the configuration shown in FIG. 6, torque transfer case 10 may be modified so as to provide double offset output shafts. Housing section 20 is replaced by housing section 220 which is suitably secured to housing section 12 and aligned by dowels 22 or the like. A sleeve 222 is secured to housing section 220 by a pin 224 or the like. Sleeve 222 defines an end portion 226 of reduced diameter on which sun gear 102 is maintained in axial alignment. Sleeve 222 has a smooth outer surface, and thus is not engaged by teeth 116 in any position of planet carrier 106. A shortened input shaft 246 replaces input shaft 46.

A rear output or propeller shaft 238 replaces output shaft 38 and stub shaft 78, and is journalled in a relocated bearing 26 so as to extend into torque transfer case 10. Output shaft 238 is splined to extension 62 of spocket assembly 54 to receive torque from the chain drive train. Cam 80 is splined to output shaft 238 such that cam 80 is rotatable with output shaft 238. This is all that is required to complete modification of the torque transfer case.

In the configuration shown in FIG. 6, the torque is not split in planetary gearset 100, but rather is transferred from input shaft 246 to sun gear 102 and from end section 108 of planet carrier 106 through sleeve 30 and the chain drive train to output shaft 238. Operation of clutch 88 is the same as in the configuration shown in FIG. 1, and torque will not be transferred to output shaft 70 until output shaft 238 speeds up so as to approach synchronization with output shaft 70. At this time, clutch 88 will engage automatically. This takes place when planetary gearset 100 is in either the high or low range position. Of course, no torque will be transferred from planet carrier 106 when planetary gearset 100 is in either the neutral or towing position.

It should be noted that operation of the transfer case will be the same when the vehicle is moving in either the forward or reverse direction; that is, with rotation of shafts 238 and 70 in the clockwise or counterclockwise direction.

The simplicity of this mechanism is apparent. It will be seen that a transfer case has been provided which normally drives one output shaft to provide conventional two-wheel drive of an associated vehicle. When required, a double-acting overrunning clutch engages automatically to provide drive to both output shafts so as to establish four-wheel drive. When four-wheel drive is no longer required, the clutch automatically disengages and the system reverts to conventional two-wheel drive.

The transfer case is adaptable to either of two configurations. In one configuration the input and one output are coaxial and the other output is offset therefrom. In another configuration both outputs are offset. Assembly in either configuration is simple, as most of the parts are interchangeable. In either configuration, high speed-low torque or low speed-high torque modes may be established by a planetary gearset having a manually slidable planet carrier. The gearset includes a sun gear as the input element and a planet carrier as the output element. Direct drive is established through toothed engagement of the sun gear with the planet carrier, and reduction ratio drive is provided through toothed engagement of the reaction ring gear with the case. In direct drive, the planets and ring gear are unloaded, thus avoiding vibratory wear commonly experienced when running heavy-duty vehicles in the locked-up condition.

It should be understood that while a preferred embodiment of the invention has been shown and described, this is illustrative and may be modified by those skilled in the art without departing from the scope thereof, which is to be limited only by the claims herein.

I claim:

1. In power transmission apparatus especially adapted for driving a motor vehicle having front and rear ground engaging wheels, said apparatus including a rotary input member adapted for connection to a source of power and rotary output means adapted for connection to said ground engaging wheels, said rotary output means including a pair of spaced primary rotary members coupled to each other for synchronous rotation and providing a driving connection for one of said wheels, and an auxiliary rotary member providing a driving connection for the other of said wheels, said auxiliary member being coupled to one of said primary members by a clutch arranged to permit overrunning of said auxiliary member with respect to said one primary member and to prevent overrunning of said one primary member with respect to said auxiliary member, and means arranged for transmission of power between said rotary input member and said rotary output means selectively in a plurality of drive conditions; the improvement wherein said power transmission means comprises a planetary gear assembly including an input sun gear in engagement with said rotary input member, and a sub-assembly including an output carrier, a ring gear, and a plurality of planet gears in meshing relationship with said sun and ring gears, said sub-assembly being slidable relative to said sun gear to a first position wherein said carrier is in engagement with said sun gear and said rotary output means and wherein said ring gear is not grounded, and to a second position wherein said carrier is not in engagement with said sun gear and is in engagement with said rotary output means and wherein said ring gear is grounded.

2. In a torque transfer assembly including a housing, an input shaft and a pair of output shafts supported for rotation in said housing, and means for transferring torque between said input shaft and said output shafts, said torque transferring means including means for selectively establishing high speed-low torque and low speed-high torque transferring modes; the improvement wherein said mode establishing means comprises a planetary gear assembly including a sun gear in driven relationship with said input shaft, and a sub-assembly, said sub-assembly having a carrier, a ring gear, and planet gear means in meshing relationship with said sun and ring gears, said sub-assembly being movable relative to said sun gear between a high speed-low torque position wherein said carrier is engaged with said sun gear and is in driving relationship with said output shafts and wherein said ring gear is not locked to said housing, and a low speed-high torque position wherein said carrier is not engaged with said sun gear and is in driving relationship with said output shafts and wherein said ring gear is locked to said housing.

3. The invention of claim 2, said torque transferring means including clutching means, said driving relationship being established by said carrier being engaged with one of said output shafts directly and with the other of said output shafts through said clutching means.

4. The invention of claim 2, said sun gear defining sun gear teeth, said planet gear means being in meshing relationship with said sun gear teeth, and said carrier meshing with said sun gear teeth in said high speed-low torque position for effecting engagement with said sun gear.

5. The invention of claim 2, wherein said planet gear means includes a plurality of planet gears in mesh with said sun and ring gears.

6. A planetary gear assembly comprising a sun gear, and a sub-assembly, said sub-assembly including a carrier, a ring gear, and a plurality of planet gears rotatably supported by said carrier in meshing relationship with said sun and ring gears, said sub-assembly being movable relative to said sun gear between a first position wherein said carrier is engaged with said sun gear for rotation therewith and said ring gear is not grounded, and a second position wherein said carrier is not engaged with said sun gear and said ring gear is grounded.

7. The invention of claim 6, said sun gear defining sun gear teeth, said planet gears being in meshing relationship with said sun gear teeth, and said carrier meshing with said sun gear teeth in said first position for effecting engagement with said sun gear.

8. In combination, a stationary member, a planetary gear assembly including a sun gear, and a sub-assembly slidable relative to said sun gear, said sub-assembly having a carrier, a plurality of planet gears in meshing relationship with said sun gear, and a ring gear in meshing relationship with said planet gears, said sub-assembly being slidable to a first position wherein said carrier is engaged with said sun gear for rotation therewith and said ring gear is not locked to said stationary member, and to a second position wherein said carrier is not engaged with sun gear and said ring gear is locked to said stationary member.

9. The invention of claim 8, said sub-assembly being slidable to a third position wherein said carrier is not engaged with said sun gear and said ring gear is not locked to said stationary member.

10. In combination, a stationary member, a rotatable input member, at least one rotatable output member, and a planetary gearset including a sun gear rotatable with said input member, a carrier slidable relative to said sun gear, a plurality of planet gears slidable with said carrier, said planet gears meshing with said sun gear, and a ring gear slidable with said carrier, said ring gear meshing with said planet gears, said carrier being slidable to a first position wherein said carrier is engaged with said sun gear and output member for rotation therewith and said ring gear is not locked to said stationary member, to a second position wherein said carrier is not engaged with sun gear and is engaged with said output member for rotation therewith and said ring gear is locked to said stationary member, and to another position wherein said carrier is not engaged with said output member and said ring gear is not locked to said stationary member.

11. The invention of claim 10, said carrier being engaged with said sun gear for rotation therewith in said other position.

12. The invention of claim 10, said first position being between said second and other positions.

13. In combination, a stationary member, a rotatable input member, at least one rotatable output member, and a planetary gearset including a sun gear rotatable with said input member, a carrier slidable relative to said sun gear, a plurality of planet gears slidable with said carrier, said planet gears meshing with said sun gear, and a ring gear slidable with said carrier, said ring gear meshing with said planet gears, said carrier being slidable to a first position wherein said carrier is engaged with said sun gear and output member for rotation therewith and said ring gear is not locked to said stationary member, to a second position wherein said carrier is not engaged with sun gear and is engaged with said output member for rotation therewith and said ring gear is locked to said stationary member, to a third position wherein said carrier is not engaged with said sun gear and is engaged with said output member for rotation therewith and said ring gear is not locked to said stationary member, and to a fourth position wherein said carrier is not engaged with said output member and said ring gear is not locked to said stationary member.

14. The invention of claim 13, said carrier being engaged with said sun gear for rotation therewith in said fourth position.

15. The invention of claim 13, said third position being between said first and second positions.

16. The invention of claim 13, said first position being between said third and fourth positions.

17. The invention of claim 13, said third position being between said first and second positions and said first position being between said third and fourth positions.

* * * * *

UNITED STATES PATENT OFFICE
CERTIFICATE OF CORRECTION

PATENT NO. : 4,103,753
DATED : August 1, 1978
INVENTOR(S) : JOHN W. HOLDEMAN

It is certified that error appears in the above-identified patent and that said Letters Patent are hereby corrected as shown below:

Column 1, line 23, change "sum gears" to
-- sun gears --.

Column 3, line 3, cancel "of" and insert -- or --.

Column 4, line 25, after "effectively" delete the comma (,).

Signed and Sealed this

Sixth Day of March 1979

[SEAL]

Attest:

RUTH C. MASON
Attesting Officer

DONALD W. BANNER
Commissioner of Patents and Trademarks

REEXAMINATION CERTIFICATE (2nd)

United States Patent [19]
Holdeman

[11] B1 4,103,753
[45] Certificate Issued  Feb. 23, 1982

[54] MANUALLY SHIFTABLE PLANETARY GEARSET

[75] Inventor: John William Holdeman, Muncie, Ind.

[73] Assignee: Borg-Warner Corporation, Chicago, Ill.

Reexamination Request
No. 90/000,014, Jul. 1, 1981

Reexamination Certificate for
Patent No.: 4,103,753
Issued: Aug. 1, 1978
Appl. No.: 762,371
Filed: Jan. 25, 1977

Certificate of Correction issued Mar. 6, 1979

Related U.S. Application Data

[63] Continuation of Ser. No. 621,194, Oct. 9, 1975, abandoned.
[51] Int. Cl.³ .................. F16H 3/44; B60K 17/34
[52] U.S. Cl. ....180/247; 74/750 R; 74/785; 180/70 R; 180/250
[58] Field of Search ................ 180/233, 247; 74/785

[56] References Cited

U.S. PATENT DOCUMENTS
1,382,289  6/1921  Janicki.

FOREIGN PATENT DOCUMENTS
415,531  8/1934  United Kingdom.

*Primary Examiner*—John P. Silverstrim

[57] ABSTRACT

A power transfer mechanism incorporating a planetary or epicyclic gearset which may be shifted manually between high and low range conditions for direct drive and reduction ratio drive modes. The ring and planet gears are unloaded in the direct drive mode, thus avoiding vibration and wear commonly experienced when running locked-up. The mechanism may be incorporated in a multiple path drive system comprising a transfer case disposed between a source of input torque and a pair of drive axles, wherein torque is transferred directly to one drive axle and automatically to the other drive axle, when required, through a double-acting overrunning clutch.

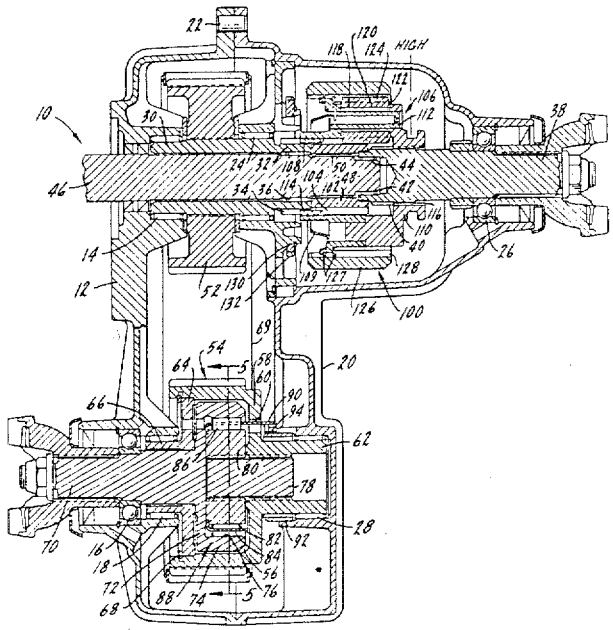

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1–17 is confirmed.

* * * * *